(12) United States Patent
Unger et al.

(10) Patent No.: US 6,302,932 B1
(45) Date of Patent: Oct. 16, 2001

(54) COMBINED WATER COALESCER ODOR REMOVAL FILTER FOR USE IN WATER SEPARATION SYSTEMS

(75) Inventors: Peter Dale Unger, Convent Station; Ronald Paul Rohrbach, Flemington, both of NJ (US); Douglas M. Dewar, Rolling Hills Estates, CA (US); Daniel E. Bause, Flanders, NJ (US); Lixin Luke Xue, Midlothian, VA (US); Richard M. Norris, Redondo Beach, CA (US); Samuel L. Penrod, Rancho Santa Margarita, CA (US); Michael K. Chan, Cerritos, CA (US); Gregory H. Barnett, Costa Mesa, CA (US)

(73) Assignees: Honeywell International, Inc., Morristown, NJ (US); The Boeing Company, Seattle, WA (US)

( * ) Notice: Subject to any disclaimer, the term of this patent is extended or adjusted under 35 U.S.C. 154(b) by 0 days.

(21) Appl. No.: 09/438,812

(22) Filed: Nov. 10, 1999

Related U.S. Application Data
(60) Provisional application No. 60/108,256, filed on Nov. 12, 1998.

(51) Int. Cl.[7] .................................................. B01D 19/00
(52) U.S. Cl. ................................. 55/306; 96/186; 96/187; 96/188; 96/189; 261/DIG. 17; 210/315
(58) Field of Search ................................... 55/306, 350.1; 96/186, 187, 188, 189, 191, 192, 223, 226; 261/DIG. 17; 210/315

(56) References Cited

U.S. PATENT DOCUMENTS

| | | |
|---|---|---|
| 2,823,760 * | 2/1958 | Andersen . |
| 3,857,732 | 12/1974 | Yoshino . |
| 4,124,360 * | 11/1978 | Berger, Jr. et al. ..................... 96/191 |
| 4,130,487 | 12/1978 | Hunter et al. . |
| 4,504,290 | 3/1985 | Pontius . |
| 4,565,727 | 1/1986 | Giglia et al. . |
| 5,106,397 * | 4/1992 | Jaroszcyk et al. ..................... 55/306 |
| 5,660,607 * | 8/1997 | Jokschas et al. ....................... 96/189 |
| 5,713,971 | 2/1998 | Rohrbach et al. . |
| 5,730,786 * | 3/1998 | Taub ...................................... 96/189 |
| 5,744,236 | 4/1998 | Rohrbach et al. . |
| 5,750,024 * | 5/1998 | Spearman .............................. 96/189 |
| 5,759,394 | 6/1998 | Rohrbach et al. . |
| 5,783,080 | 7/1998 | Hsieh . |
| 5,951,744 | 9/1999 | Rohrbach et al. . |
| 6,123,751 * | 9/2000 | Nelson et al. ......................... 55/306 |

OTHER PUBLICATIONS

Penrod, Samuel L., et al., Filtration of Aircraft Cabin Air Odors in 100% Relative Humidity, Low Temperature Conditions, Presentation to 1998 International Mechanical Engineering Congress & Exposition, Nov. 15, 1998, pp. 1–8.

* cited by examiner

*Primary Examiner*—David A. Simmons
*Assistant Examiner*—Minh-Chau T. Pham

(57) ABSTRACT

A filter for coalescing water and removing odor from air includes a water coalescing layer made of a synthetic fiber and an odor removal layer including an adsorbent material that operatively interfaces the coalescing layer. The coalescing and removal layers are shaped to receive and expel the air. Both layers can be supported by a frame and/or an outer support layer of polyester material.

30 Claims, 5 Drawing Sheets

COMBINED WATER COALESCER ODOR REMOVAL FILTER FOR USE IN WATER SEPARATION SYSTEMS

CROSS REFERENCE TO RELATED APPLICATIONS

This application claims the benefit of U.S. Provisional application filed Nov. 12, 1998, Ser. No. 60/108,256.

BACKGROUND OF THE INVENTION

The present invention generally relates to water separation systems and, more particularly, to apparatus and methods for coalescing water and removing odors from air.

Low concentrations of odiferous compounds frequently contaminate aircraft cabin air. The most likely sources of such odors are engine oil, hydraulic fluid, and rub seal. As such, the odor causing molecules are probably high molecular weight decomposition products of the foregoing materials. One solution for odor control is the treatment of contaminated air with activated carbon filters. While treatment of odors with activated carbon has a long history of application, little has been done in the context of high humidity, cold air environments such as those found in aircraft low-pressure water separator systems.

A typical low pressure water separator system processes low temperature, high humidity air exiting the aircraft air conditioning system. The original purpose of the water separator, as its name implies, is to remove entrained liquid water from the water saturated air stream. This is accomplished in three steps: first coalescence of water droplets on a coalescer "bag" filter; then a centrifugal separation step which spins the water droplets away from the air stream into the water collector area or sump of the separator; and then water is removed from the sump by venting to the atmosphere.

An example of using activated carbon to remove odors is found in U.S. Pat. No. 3,857,732. A conventional non-woven fabric has its fibers coated with a water insoluble composition that can include activated carbon. Alternatively, a pasty mass having activated carbon can be impregnated into the fabric. Similarly, U.S. Pat. No. 5,744,236 discloses a non-woven media of fibers made of polyamides, polyesters, or polyolefins. Activated carbon is entrapped within the hollow cavities of the fibers in the absence of an adhesive to thereby adsorb odor molecules. However, the foregoing only describe the ability to remove odors from air, not the ability to also remove water that can be present in aircraft cabin air, for example.

A non-woven activated carbon fabric is shown in U.S. Pat. No. 4,565,727 for the use of protective clothing, although air conditioning filters were also contemplated. The fabric is prepared by wet-laying the activated carbon with fibrillated acrylic fibers. Thereby, toxic compounds are absorbed and water vapor (such as perspiration) permeates through the fabric. Of course, since water vapor permeates, the fabric is not removing water.

A filter that not only removes odors but also absorbs water is described in U.S. Pat. No. 5,783,080 wherein the filter is prepared with a first catalyst (such as hydrochloric acid), a second catalyst (such as formalin), a vegetable starch, a liquid non-particle polyvinyl alcohol, and active carbon. The foregoing is coated on a plate fiber that has percolating holes that serve to absorb water. A subsequent drying step is required to remove the absorbed water from the filter. Accordingly, a disadvantage to this filter is the need for additional processing for water removal. In addition, the technique described in this disclosure requires the use of a binder to immobilize the carbon onto the support substrate, and consequently loss of activity of the activated carbon can be expected.

Another filter that is described as having the ability to remove water vapor and odor from air is in U.S. Pat. No. 4,130,487. In one embodiment of the filter, two pleated sheets of laminated filter media include glass fibre filter paper bonded to a filter material or paper. The pleated sheets are supported at their interior and exterior surfaces by cylinders of expanded metal. This filter is claimed to remove water mist from an air stream, although no evidence of this ability is presented nor is the concept of water droplet coalescence mentioned. The process, as described, treats water or oil droplets as particulate contaminates, and there are apparently no provisions which show how the described process can result in the coalescence of water droplets into a bulk fluid which is gathered into a sump for later removal by draining. In another embodiment, a pleated sheet of an activated carbon layer and a paper filter media layer is provided between two cylinders of expanded metal for support. The filter media layer includes a glass fiber filter paper bonded to a filter material or paper. The carbon layer is outside of the filter media layer. The carbon layer adsorbs gases and the filter layer removes particulate matter, although neither apparently removes water vapor. In both of the two embodiments, air flows from outside to the inside of the filter. Disadvantages, however, to this design include vast complexity in design, and the inability to handle saturating levels of water in the incoming process air stream. This is evidenced by the lack of a means to remove excess water than will inevitably build up in the filter system.

As can be seen, there is a need for an improved filter and method that not only removes water but also odors from an air stream. A filter and method is needed that can operate in conjunction with a low pressure water separator system in, for example, aircraft. A further need is for a filter and method that coalesces water and removes odors from an air stream at a low temperature and high humidity. An additional need is for a filter and method that removes water and odors from air moving at a high velocity. A filter and method of coalescing water and removing odor from an air stream is needed that is simple in design and can easily serve as a retrofit to existing environmental control systems, such as ones that provide an air supply to a cabin of an aircraft.

SUMMARY OF THE INVENTION

In one aspect of the present invention, a filter for coalescing water and removing odor from air comprises a coalescing layer comprising a synthetic fiber; and an odor removal layer comprising an adsorbent material that operatively interfaces the coalescing layer, with the coalescing and removal layers being shaped to receive and expel the air.

In another aspect of the present invention, a method of coalescing water and removing odor from air comprises the steps of juxtaposing a coalescing layer and an odor removal layer to receive and expel the air; channeling the air through the coalescing layer to coalesce said water, with the coalescing layer comprising a synthetic fiber; and channeling the air through the removal layer comprising an adsorbent material following the step of channeling the air through the coalescing layer.

These and other features, aspects and advantages of the present invention will become better understood with reference to the following drawings, description and claims.

DETAILED DESCRIPTION OF THE INVENTION

The present invention is described below in the context of aircraft and low pressure water separator systems. However, it should be understood that the present invention is not so limited. For example, the present invention may find use in a context of where an air stream generally contains unwanted odors and has an undesired high relative humidity. The present invention may also be practiced in circumstances where the air not only has undesired odors and humidity, but the air is also traveling at a high velocity and a low temperature.

Figure 1:
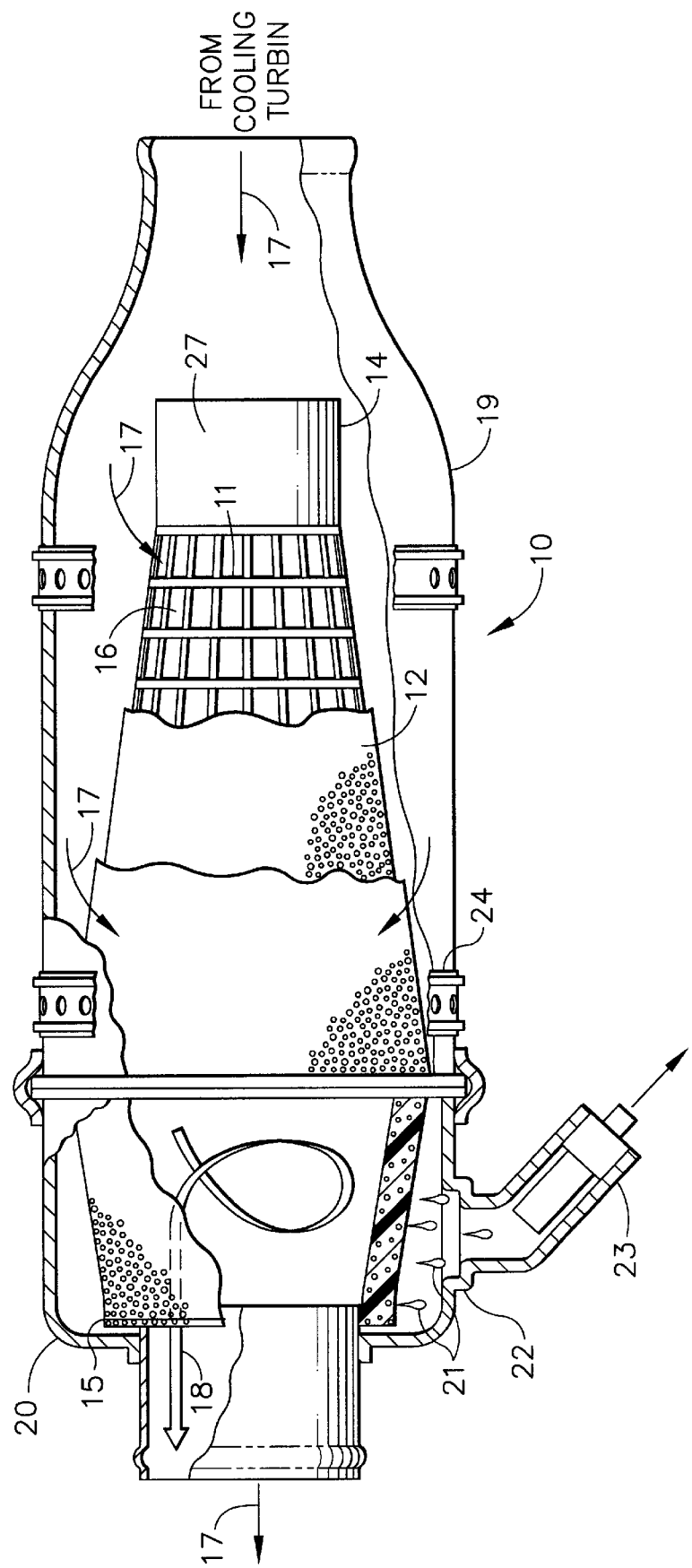
FIG. 1 is a side view of a filter according to one embodiment of the present invention.

In FIG. 1, a filter 10 according to one embodiment of the present invention is shown. An inlet shell 19 and an outlet shell 20 enclose or house the filter 10. A clamp and seal 24 of any well known design can be used to seal the shells 19, 20 together. In this embodiment, the shells 19, 20 are generally cylindrical in shape, although other shapes can be used. The shells 19, 20 channel an inlet air 17, such as one from a cooling turbine of an aircraft air conditioning system that uses a low pressure water separator into the filter 10 and then out of the filter 10 as an outlet or conditioned air 18, as further described below. However, it should be understood that the present invention can be practiced without the shells 19, 20.

The inlet air 17 that can be conditioned by the filter 10 can have varying characteristics. If, for example, the inlet air 17 is from a low pressure water separator system of an aircraft, the inlet air 17 may be at a temperature ranging from about 1 to 100° C., may have a relative humidity from about 0 to 100%, and may contain water droplets as a mist entrained in the inlet air. The velocity of the inlet air 17 may range from about 0 to 200 meters/minute.

The filter 10 includes a first or inlet end 14 for receiving the inlet air 17. The inlet end 14 interfaces and is formed by a water coalescing layer 12 and an odor removal layer 13 described below. Likewise, a second or outlet end 15 interfaces and is formed by the layers 12, 13. The outlet end 15 is disposed at an end of the filter 10 opposite the inlet end 14 for expelling the outlet air 18 (as well as the inlet air 17 that is not filtered). At the inlet end 14 a relief valve 27 that can be constructed according to any well known design is positioned in the flow of the inlet air 17 to allow an excess amount of the inlet air 17 to flow through the inlet end 14 and out the outlet end 15. In general, and as further described below, the inlet air 17 is conditioned by it being primarily channeled through the filter 10 in a direction that is substantially perpendicular to the longitudinal axis of the filter 10, as opposed to substantially parallel to such axis when entering the inlet end 14. Thus, the relief valve 27 can be opened and closed when the pressure within the inlet shell 19 reaches predetermined levels.

Figure 2:
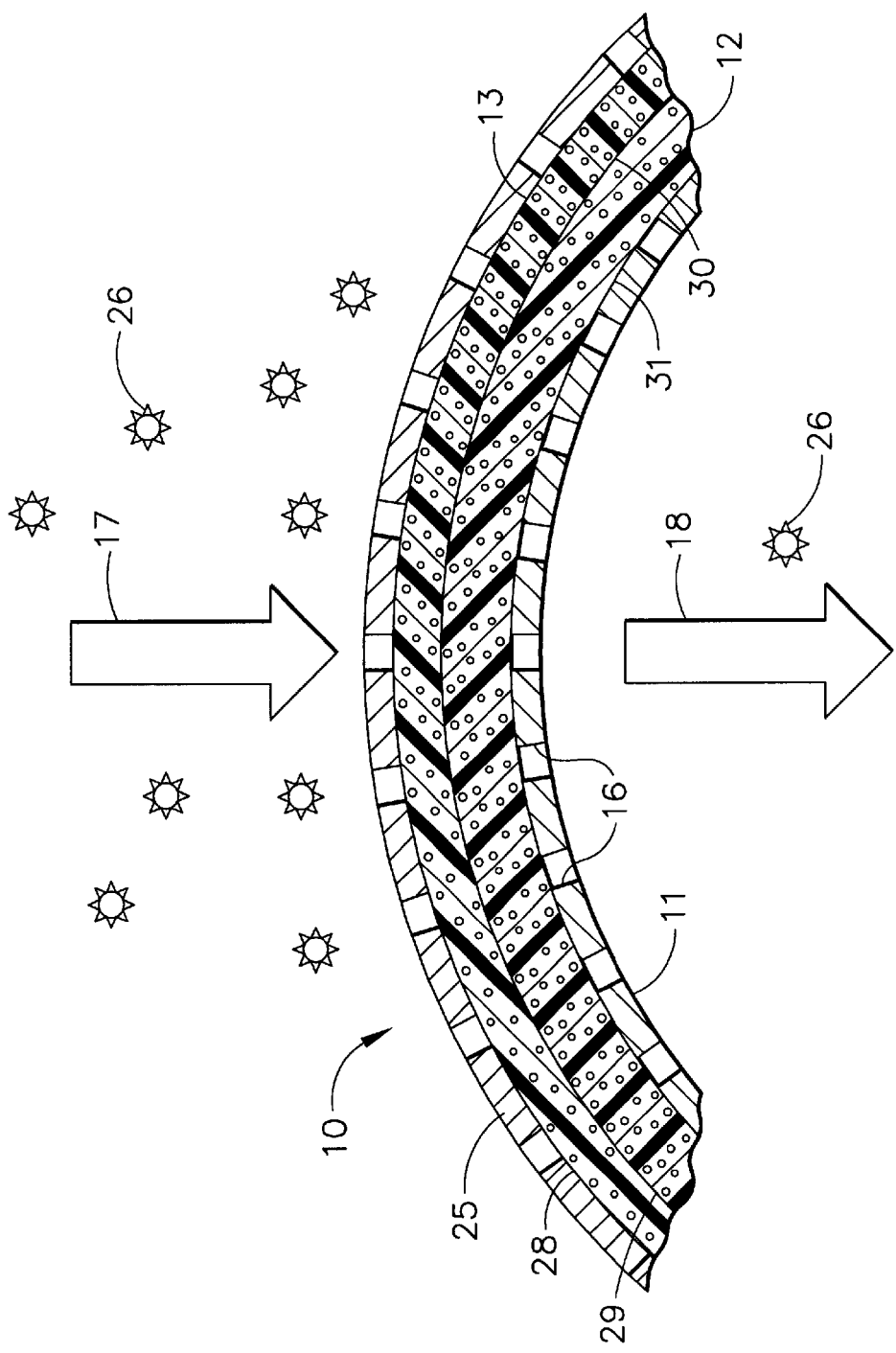
FIG. 2 is a cross-sectional view of a filter according to another embodiment of the present invention.

For the embodiment shown in FIG. 1, the filter 10 further includes the above mentioned odor removal layer 13 that removes odor molecules 26 (FIG. 2) contained in the inlet air 17. This is achieved by the inlet air 17 entering the inlet shell 19 and then being swirled across an inlet air side 28 of the removal layer 13. The inlet air side 28 faces opposite the inlet shell 19. In this embodiment, the removal layer 13 is of a conical shape, which in conjunction with the shape of the inlet shell 19, tends to create the swirling action of the inlet air 17. Nevertheless, the shape of the removal layer 13 can vary. Irrespective of the shape of the removal layer 13, the swirled inlet air 17 is channeled through the inlet air side 28 of the removal layer 13. Once inside the removal layer 13, the odor molecules 26 are adsorbed by the adsorbent material(s) comprising the removal layer 13. Accordingly, useful materials for the removal layer 13 include woven activated carbon, non-woven activated carbon, and woven or non-woven materials including fibers and foams coated with granular or powdered activated carbon or zeolitic powders. The activated carbon or other granular or powdered odor sorbents may also be impregnated with agents that extend or enhance their odor removal functionality, such as acidic and alkaline agents, metals and metal salts or other compounds with which the odor molecules may chemically react. Upon the odor molecules 26 being adsorbed, the inlet air 17 exits through an outlet air side 30 of the removal layer 13.

The water coalescing layer 12 mentioned above is juxtaposed to the odor removal layer 13 such that an inlet air side 29 of the coalescing layer 12 is immediately adjacent to the outlet air side 30 of the removal layer 13. Preferably, the coalescing layer 12 is affixed or adhered to the removal layer 13, such as by sewing. Thereby, the inlet air 17 is channeled from the removal layer 13 and into the coalescing layer 12. As with the water removal layer 13, the coalescing layer 12 is conical in shape to match the shape of the removal layer 13, although other configurations are contemplated. The nature of the material itself comprising the coalescing layer 12 coalesces water that is contained in the inlet air 17 moving through the layer 12. Suitable materials for the coalescing layer 12 can, therefore, generally include synthetic fibers or polyesters, such as Dacron™. Once the coalescing layer 12 coalesces the water, coalesced water in the form of water droplet(s) 21 flows out of the filter 10, as further described below. Upon the water in the inlet air 17 coalescing, the inlet air 17 exits the coalescing layer 12 at its outlet air side 31.

A frame 11 of the filter 10 is juxtaposed to the outlet air side 31 of the coalescing layer 12. The frame 11 receives and channels through it the inlet air 17 and coalesced water, as better seen in FIG. 2. The frame 11 also structurally supports the water coalescing layer 12 and the odor removal layer 13. Accordingly, the frame 11 can be made of various materials that are rigid and resistant to moisture, such as aluminum, stainless steel, coated or galvanized steel, other metals or rigid polymeric materials. While the frame 11 is shown with a conical shape to preferably match the configuration of the coalescing and removal layers 12, 13, other configurations can be used such as simple cylindrical or even flat panels. The frame 11 further includes air slots 16 that are disposed in the frame 11 to receive the inlet air 17 at an inlet air side of the frame 11 and expel the inlet air 17 and coalesced water at an outlet air side of the frame 11. The air slots 16 are preferably dispersed in a substantially uniform manner and across substantially the entire surface area of the frame 11.

This maximizes the amount of inlet air 17 that is channeled through the filter 10 and, thus, maximizes the amount of inlet air 17 that is conditioned. It also maximizes the uniformity of conditioning.

In still referring to FIG. 1, the filter 10 also includes a sump 22 that is disposed at the outlet shell 20. The sump 22 collects, as a result of gravity, the coalesced or water droplets 21 from the coalescing layer 12. From the sump 22, the water droplets 21 exit the filter 10 through a drain 23.

Optionally, the filter 10 can include an outer support layer 25 that covers the inlet air side 28 of the odor removal layer 13. The support layer 25 provides physical integrity to the filter 10 and, particularly, the removal layer 13. Useful materials for the support layer 25 include polyester materials.

In another embodiment of the invention (not shown), the water coalescing layer and odor removal layer are combined into a single layer. In such instance, the single layer can be made of a mixture of fibers of different types, some contributing to the odor removal functionality, and others devoted to the coalescence of the water droplets. It is also possible that all the fibers in the combined odor removal coalescer filter may be of a single type which have the required versatility of both removal of odor molecules and coalescence of water droplets, such as activated carbon fiber or coated fiber with the appropriate fiber diameter, fiber geometry and loft density which may induce water coalescence. The remainder of the filter 10 can be constructed with a support layer 25 and frame 11, as in the above embodiment.

In again referring to FIGS. 1 and 2, it can be seen that the present invention provides a method of removing odor and coalescing water from an air stream. The coalescing layer 12 is juxtaposed to the odor removal layer 13, both of which are shaped to receive and expel an inlet air 17. As a result of the provision of the inlet and outlet shells 19, 20, together with the configuration of the layers 12, 13, the inlet air 17 is channeled through the odor removal layer 13 where odor molecules 26 are adsorbed. Concurrently, excess inlet air 17 may flow through the valve 27 and out of the outlet end 15 without being conditioned. Irrespective of whether there is air flow through the valve 27, the inlet air 17 passes through the removal layer 13 and is then channeled into the coalescing layer 12. In the coalescing layer 13, water in the inlet air 17 is coalesced and then collected. The resulting outlet air 18 is conditioned in the sense that odors have been removed and the humidity has been lowered.

EXAMPLE 1

A number of different activated carbon media were tested for their chemical uptake performance, using toluene as the model challenge compound. The filters studied included woven and non-woven activated carbon fibers, and woven or non-woven materials coated with granular or powdered activated carbon or zeolitic powders. Table 1 below describes the different filter materials used.

TABLE 1

| Vendor | Sample | Specific Surface Area BET (m$^2$/g) | Total Pore Volume (cm$^3$/g) | Average Pore Radius (Angstrom) | Nominal Run Density (g/m$^2$) | Product Description |
|---|---|---|---|---|---|---|
| A | 1 | 1307 | 0.560 | 8.5 | 78 | Activated Carbon fiber felt (nonwoven) |
| A | 2 | 1000–1350 | 0.4–0.6 | 8–11 | 126 | Activated Carbon fiber felt (nonwoven) |
| A | 3 | 1000–1350 | 0.4–0.6 | 8–11 | 333 | Activated Carbon fiber felt (nonwoven) |
| A | 4 | 1687 | 0.721 | 17 | 249 | Activated Carbon fiber felt (nonwoven) |
| B | 1 | | | | 532 | Activated Carbon Cloth (woven ACC) Laminated to a Water Repellent Layer |
| B | 2 | | | | 831 | Two layers of woven ACC and Water Repellent Layer |
| B | 3 | | | | 1006 | Three layers of woven ACC and Water Repellent Layer |
| C | 1 | 1050–1400 | N/A | 20 | 232 | Activated carbon cloth (woven) |
| D | 1 | 1200 | N/A | 7–9 | 315 | Activated carbon cloth (woven) |
| E | 2 | 1000 | 0.5 | 20 | 217 | Activated carbon fiber felt (nonwoven) |

The experimental apparatus described below exposed 40 mm diameter fibers of 1 to 10 mm thickness to air face velocities from 50 to 180 m/min. Nominal run conditions were 1–2° C. at 100% RH. A hydrocarbon detector monitored influent and effluent toluene concentrations each minute to yield breakthrough curves of toluene effluent concentration versus time. The effect of influent concentration of toluene was studied by measuring breakthrough curves at 5, 10, 20, and 40 ppmv. Pressure, flow rate, and temperature sensors also provided real time data during breakthrough curve measurements.

The test apparatus was constructed of teflon or stainless steel tubing and stainless steel valves, and fittings. All gas flows, including the concentrated test gas, were measured using mass flow meters. The main carrier compressed air source was cooled to −40° C. by directing the gas stream through a heat exchanger unit equipped with dry ice cooling. The temperature was subsequently adjusted to the desired level by dilution of the super-chilled air with a separate stream of compressed air at ambient temperature. A concentrated stream of toluene gas (from a compressed gas cylinder) was introduced into the chilled air stream at this point to yield the desired challenge concentration. The chilled air containing the test gas was then humidified to 100% RH using a stainless steel gas washing reservoir and the humidified air was routed to the test filter housing. The relative humidity and temperature of the challenge gas were measured at a point immediately upstream of the filter housing. The data acquired were transmitted to a central logging device. The filter housing was fabricated from a commercial unit constructed of polysulfone polymer. The filter housing accommodated a circular 50 mm diameter filter, 40 mm of which was exposed to the challenge gas flow. All filters were tested in the flat. Where required, air flow pathways and components were coated with insulating foam to minimize heat gain. The effluent gas from the filter was then directed to a total hydrocarbon monitor (flame ionization detector) for quantitation of hydrocarbon in the treated air.

Figure 3:
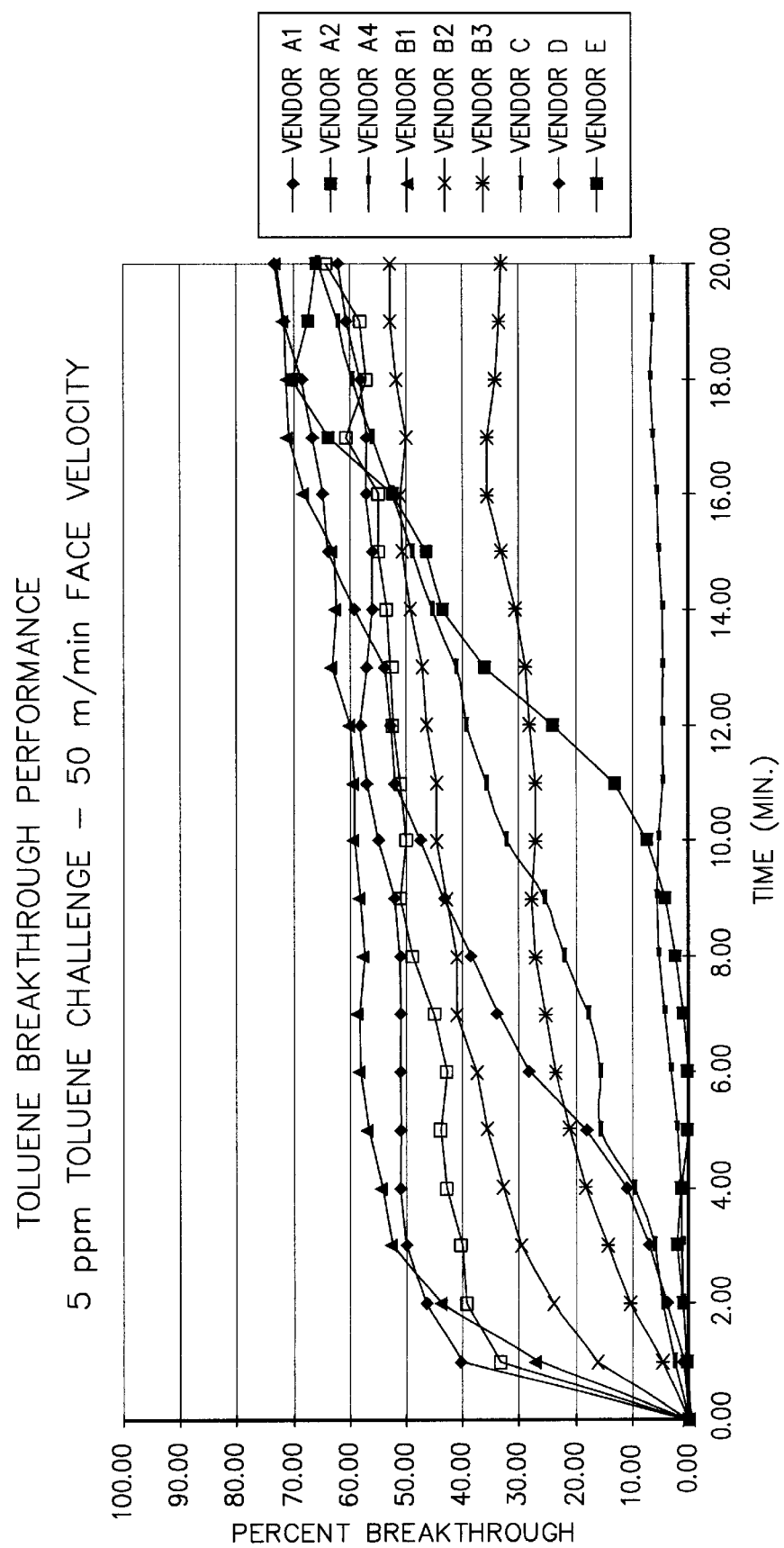
FIG. 3 is a graph of percentage breakthrough of a challenge gas versus time at a face velocity of 50 m/minute for different materials in a filter according to an embodiment of the present invention.
Figure 4:
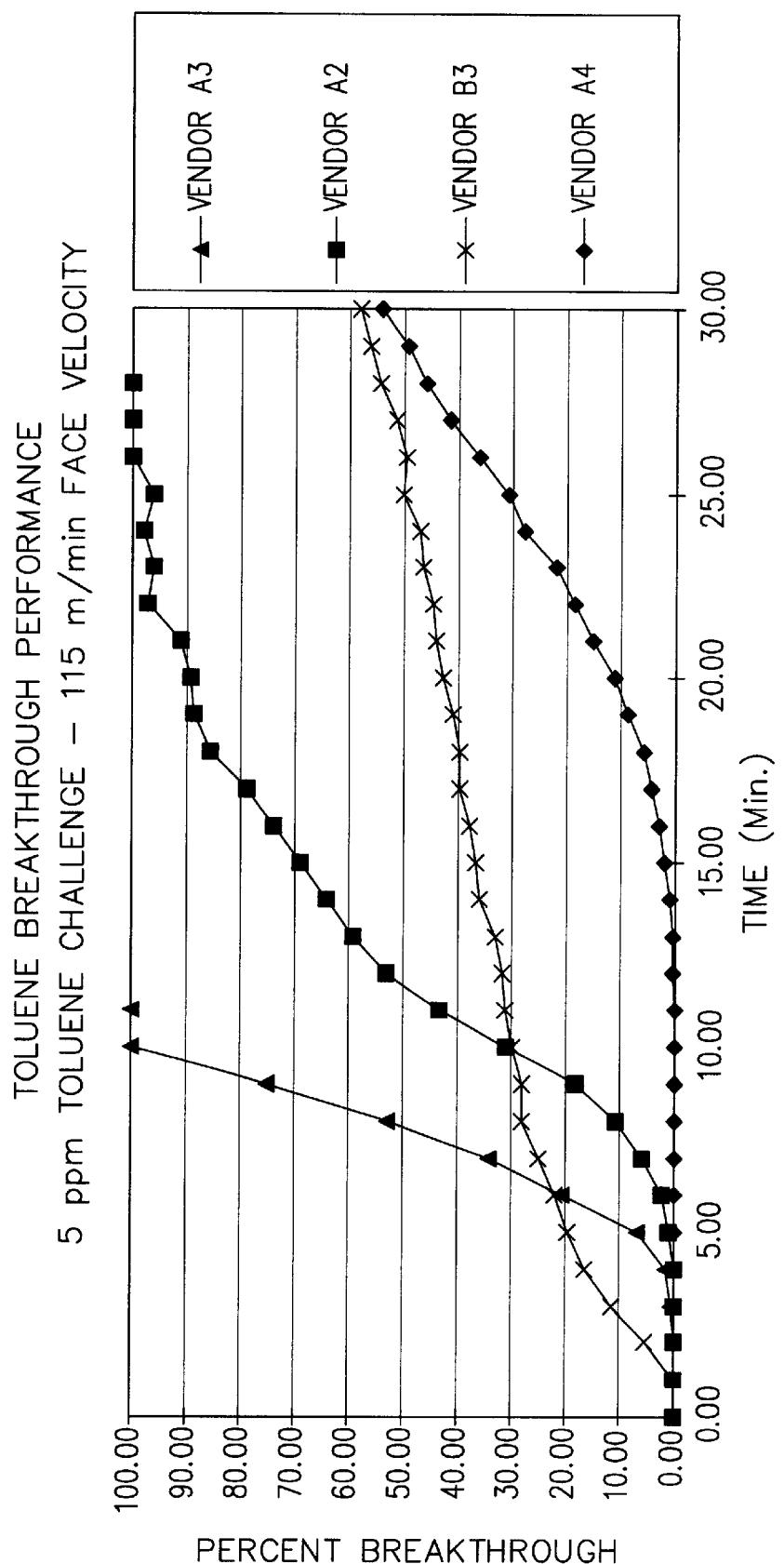
FIG. 4 is a graph of percentage breakthrough of a challenge gas versus time at a face velocity of 115 m/minute for different materials in a filter according to an embodiment of the present invention.
Figure 5:
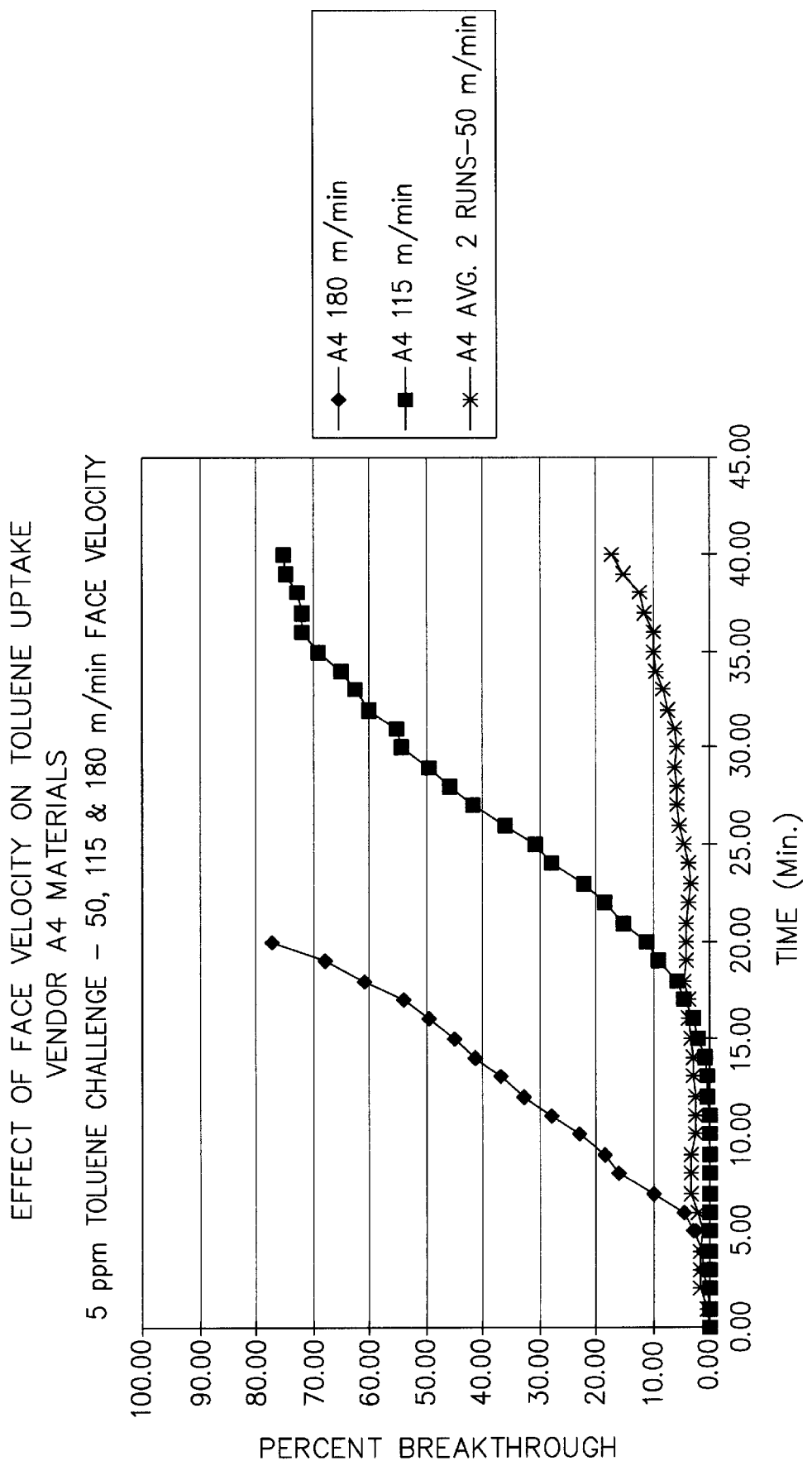
FIG. 5 shows the effect of face velocity on the toluene breakthrough profiles.

FIG. 3 shows the breakthrough results obtained from some of the filter materials tested at 5 ppm toluene challenge and 50 meters/minute face velocity. FIG. 4 shows the breakthrough results of various activated carbon media at 5 ppm toluene challenge and 115 meters/minute face velocity. FIG. 5 shows the effect of face velocity on the toluene breakthrough profiles of materials from a vendor designated A4.

EXAMPLE 2

A separate test assembly fitted with differential pressure monitors was used to determine airflow resistance (pressure drop) of the various test filters. Filters were mounted in a special filter housing and exposed to airflows yielding face velocities on 11.1 to 178.5 meters/minute in four steps. Results from some of the materials tested are shown in Table 2 below.

TABLE 2

| Filters | Thk (mm) | Face Velocity (m/min) | | | | |
| --- | --- | --- | --- | --- | --- | --- |
| | | 11.1 | 29.8 | 59.5 | 119.0 | 178.5 |
| A1 | 2 | 0.02 | 0.07 | 0.19 | 0.39 | 0.66 |
| A2 | 2.5 | 0.07 | 0.23 | 0.54 | 1.18 | 1.95 |
| A3 | 4.3 | 0.32 | 1.11 | 2.42 | 4.97 | 7.79 |
| A4 | 3.5 | 0.15 | 0.52 | 1.17 | 2.42 | 3.57 |
| B1 | 1.6 | 0.31 | 1.08 | 2.57 | 6.03 | 9.82 |
| B2 | 2.5 | 0.47 | 1.54 | 3.63 | 7.96 | |
| B3 | 3.4 | 1.29 | 4.67 | 10.75 | | |
| C1 | 1.5 | 0.04 | 0.15 | 0.42 | 1.23 | 2.09 |
| D1 | 1 | 0.05 | 0.25 | 0.81 | 2.75 | 5.16 |
| E1 | 3.5 | 0.05 | 0.23 | 0.57 | 1.31 | 2.07 |

As can be appreciated by those skilled in the art, the present invention provides an improved filter and method that not only removes water but also odors from an air stream. A filter and method is provided that can operate in conjunction with a low pressure water separator system in, for example, aircraft. The filter and method of the present invention coalesces water and removes odors from an air stream at a low temperature and high humidity. The present invention also removes water and odors from air moving at a high velocity. The filter and method of coalescing water and removing odor from an air stream, according to the present invention, can easily serve as a retrofit to exiting ducting of environmental control systems, such as ones that provide an air supply to a cabin of an aircraft. The present invention also provides a water and odor removal filter that is fire retardant, as well as being resistant to mold, temperature swings, and vibration.

It should be understood, of course, that the foregoing relates to preferred embodiments of the invention and that modifications may be made without departing from the spirit and scope of the invention as set forth in the following claims.

We claim:

1. A filter for coalescing water and removing odor from air, comprising:
   a coalescing layer comprising a synthetic fiber; and
   an odor removal layer comprising an adsorbent material juxtaposed to said coalescing layer.

2. The filter of claim 1, further comprising a frame that supports said coalescing and removal layers.

3. The filter of claim 1, further comprising a support layer that supports said removal layer.

4. The filter of claim 1, further comprising an inlet end and an outlet end that operatively interface said coalescing and removal layers.

5. The filter of claim 1, further comprising a relief valve that operatively interfaces said coalescing and removal layers.

6. The filter of claim 1, wherein said coalescing layer is adhered to said removal layer.

7. The filter of claim 1, wherein said adsorbent material comprises a compound selected from the group consisting of activated carbon and zeolite.

8. A filter for coalescing water and removing odor from air processed by a low pressure water separator system, comprising:
   a coalescing layer comprising synthetic fiber;
   an odor removal layer comprising an adsorbent material that is juxtaposed to said coalescing layer and is operatively interfaced with said coalescing layer;
   said coalescing and removal layers being shaped to receive and expel said air.

9. The filter of claim 8, further comprising a frame disposed adjacent an outlet air side of said coalescing layer.

10. The filter of claim 9, wherein said frame comprises air slots.

11. The filter of claim 8, further comprising a support layer disposed adjacent an inlet air side of said removal layer.

12. The filter of claim 8, further comprising an inlet end and an outlet end, both of which interface said coalescing and removal layers.

13. The filter of claim 12, further comprising a relief valve adjacent said inlet end.

14. The filter of claim 8, further comprising an inlet shell and an outlet shell that enclose said coalescing and removal layers.

15. The filter of claim 8, wherein said adsorbent material comprises a compound selected from the group consisting of woven activated carbon; non-woven activated carbon; fibers coated with granular or powdered activated carbon or zeolitic powders; and foams coated with granular or powdered activated carbon or zeolitic powders.

16. The filter of claim 8, wherein said coalescing layer and removal layer respectively coalesce water and remove odor at about 0 to 5° C. and about 100% relative humidity.

17. A filter for coalescing water and removing odor from air processed by a low pressure water separator system, comprising:
   a combined coalescing and odor removal layer comprising a synthetic fiber and an absorbent material; and
   a support layer disposed adjacent an inlet air side of said coalescing and removal layer;
   said coalescing and removal layer being shaped to receive and expel said air.

18. A method of coalescing water and removing odor from air comprising the steps of:
   channeling said air through a coalescing layer comprising a synthetic fiber; and
   channeling said air through an odor removing layer comprising an adsorbent material following the step of channeling said air through siad coalescing layer;
   said coalescing layer and said odor removing layers being juxtaposed to one another.

19. The method of claim 18, further comprising the step of juxtaposing said coalescing layer to said removal layer.

20. The method of claim 18, further comprising the step of receiving said air at an inlet air side of said coalescing and removal layers.

21. The method of claim 18, further comprising the step of expelling said air at an outlet air side of said coalescing and removal layers.

22. The method of claim 18, further comprising the step of coalescing said water on said coalescing layer.

23. The method of claim 18, further comprising the step of adsorbing in said removal layer odor molecules from said air.

24. A method of coalescing water and removing odor from air processed by a low pressure water separator system, comprising the steps of:

juxtaposing a coalescing layer and an odor removal layer to receive and expel said air;

channeling said air through said coalescing layer to coalesce said water, said coalescing layer comprising a synthetic fiber; and channeling said air through said removal layer comprising an adsorbent material following the step of channeling said air through said coalescing layer.

25. The method of claim 24, wherein the step of juxtaposing said coalescing and removal layers comprises the step of interfacing an outlet air side of said removal layer to an inlet air side of said coalescing layer.

26. The method of claim 24, further comprising the step of receiving said air at an inlet air side of said coalescing and removal layers.

27. The method of claim 24, further comprising the step of expelling said air at an outlet air side of said coalescing and removal layers.

28. The method of claim 24, further comprising the step of swirling said air about an inlet air side of said removal layer.

29. The method of claim 24, wherein the step of channeling said air through said coalescing and removal layers occurs at about 0 to 5° C. and about 100% relative humidity.

30. A method of coalescing water and removing odor from air processed by a low pressure water separator system, comprising the steps of:

receiving said air in a combined coalescing and odor removal layer; and channeling said air through said coalescing and removal layer to coalesce said water and remove odor molecules from said air.

* * * * *